United States Patent [19]

Kuroda

[11] Patent Number: 5,158,059
[45] Date of Patent: Oct. 27, 1992

[54] METHOD OF DETECTING ABNORMALITY IN AN INTERNAL COMBUSTION ENGINE

[75] Inventor: Shigetaka Kuroda, Wako, Japan

[73] Assignee: Honda Giken Kogyo K.K., Tokyo, Japan

[21] Appl. No.: 750,526

[22] Filed: Aug. 27, 1991

[30] Foreign Application Priority Data

Aug. 30, 1990 [JP] Japan ................... 2-229999

[51] Int. Cl.[5] .................... F02D 41/14; F02D 41/22
[52] U.S. Cl. .................... 123/690; 60/285;
123/479; 123/520; 123/691; 123/698
[58] Field of Search ........... 123/479, 440, 489, 520;
60/285; 364/431.05

[56] References Cited

U.S. PATENT DOCUMENTS

| | | | |
|---|---|---|---|
| 4,819,427 | 4/1989 | Nagai et al. | 60/285 X |
| 4,819,602 | 4/1989 | Mieno et al. | 123/489 X |
| 4,844,038 | 7/1989 | Yamato et al. | 123/489 X |
| 4,947,818 | 8/1990 | Kamohara et al. | 123/489 X |
| 4,949,695 | 8/1990 | Uranishi et al. | 123/520 |
| 4,962,744 | 10/1990 | Uranishi et al. | 123/520 |
| 4,964,271 | 10/1990 | Sawada et al. | 60/285 X |
| 5,052,361 | 10/1991 | Ono et al. | 123/489 |
| 5,070,847 | 12/1991 | Akiyama et al. | 123/489 |
| 5,077,970 | 1/1992 | Hamburg | 60/285 |
| 5,085,194 | 2/1992 | Kuroda et al. | 123/489 X |

FOREIGN PATENT DOCUMENTS 60-240840 11/1985 Japan .

Primary Examiner—Willis R. Wolfe
Attorney, Agent, or Firm—Arthur L. Lessler

[57] ABSTRACT

A method of detecting abnormality in an internal combustion engine, which is applied to at least one of a catalyst system, an evaporative fuel-purging system, a fuel supply system, an air-fuel ratio sensor, and an ignition system, for performing detection of abnormality therein according to operating parameters of the engine. An amount of residual fuel in the fuel tank is detected and the amount of residual fuel is compared with a predetermined value. The abnormality detection is inhibited when, as a result of the comparison, the amount of residual fuel is below the predetermined value.

8 Claims, 13 Drawing Sheets

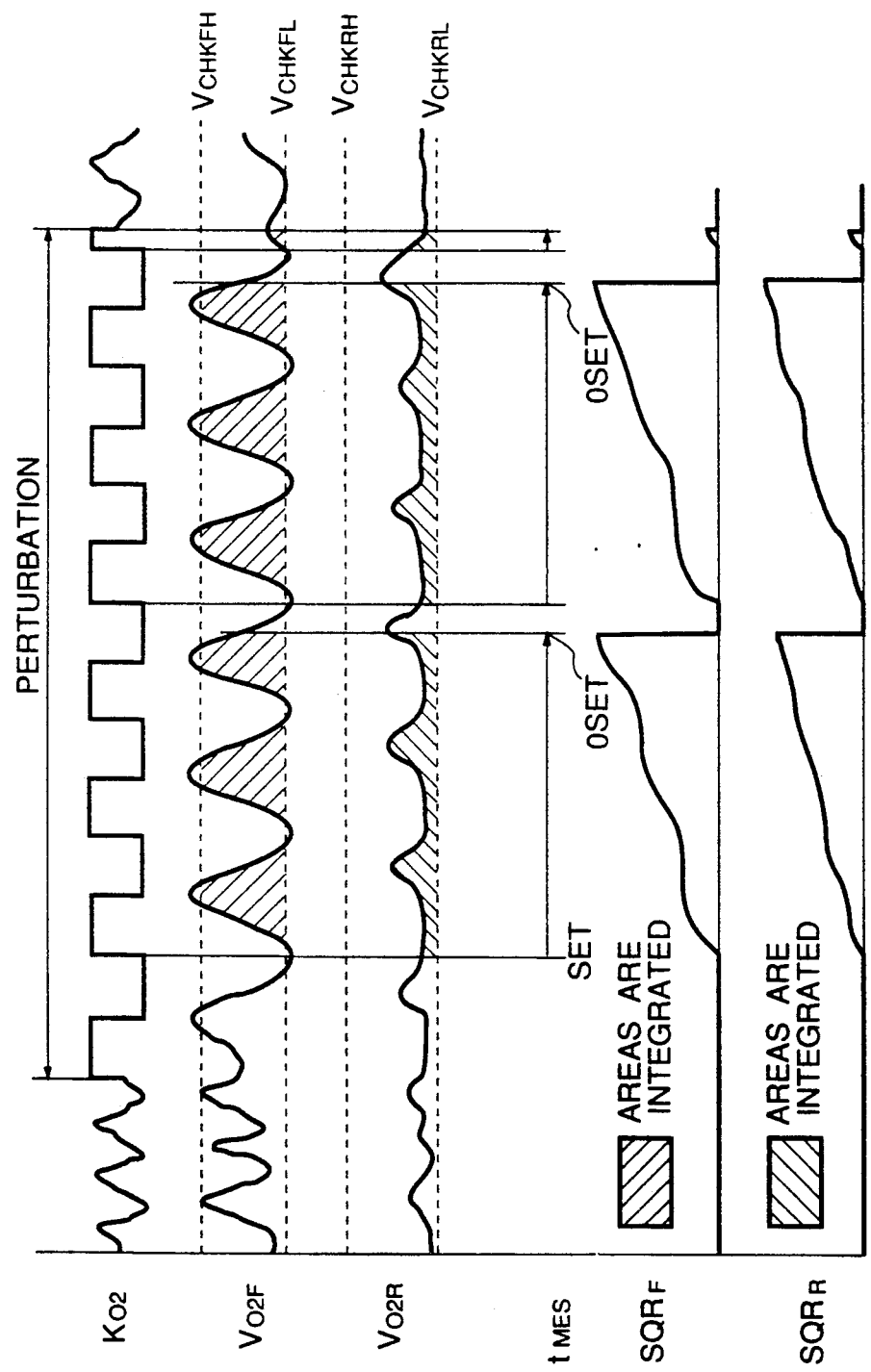

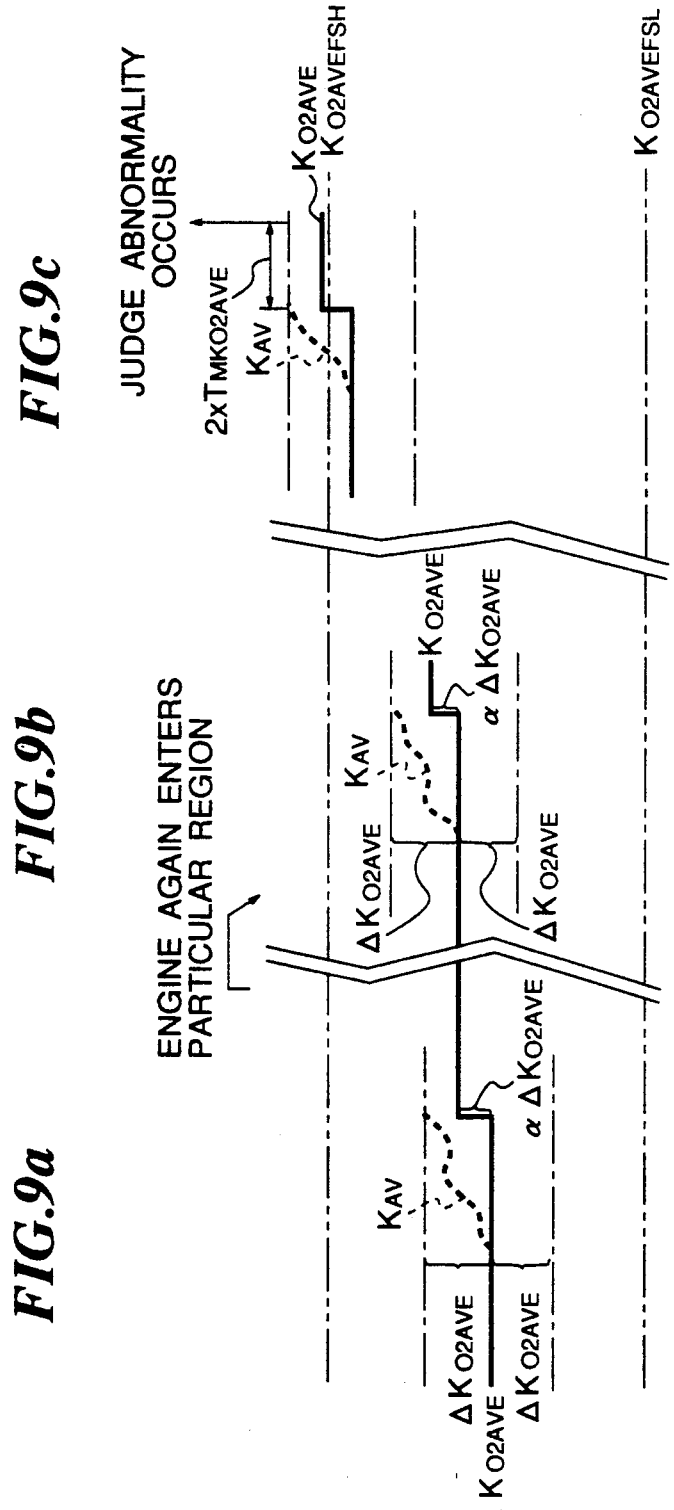

METHOD OF DETECTING ABNORMALITY IN AN INTERNAL COMBUSTION ENGINE

BACKGROUND OF THE INVENTION

This invention relates to a method of detecting abnormality in various systems or devices of an internal combustion engine, such as a catalyst system, evaporative fuel-purging system, fuel supply system, air-fuel ratio sensor and ignition system.

A method of detecting deterioration of a three-way catalyst in an internal combustion engine having such a catalyst in the exhaust pipe, and an upstream air-fuel ratio sensor and a downstream air-fuel ratio sensor arranged in the exhaust pipe upstream and downstream of the catalyst to detect the air-fuel ratio of exhaust gases from the engine, has already been proposed by the assignee of the present application (Japanese Patent Application No. 2-117890).

According to this proposed method, deterioration of the three-way catalyst is detected by comparing a first area between a first signal and a third signal in the signal waveform output by the upstream air-fuel ratio sensor with a second area between a second signal and a fourth signal in the signal waveform output by the downstream air-fuel ratio sensor, based on the first and second signals output respectively by the upstream and downstream air-fuel ratio sensors when the fuel supply to the engine has been increased, and based on the third and fourth signals output respectively by the upstream and downstream air-fuel ratio sensors when the fuel supply to the engine has been stopped; and by comparing the temperature of the catalyst with a first temperature exhibited by the catalyst when the HC purifying percentage $\eta$ is 50%, and with a second temperature exhibited by the catalyst depending on the engine load.

A method of detecting deterioration of an exhaust gas component concentration sensor in an internal combustion engine, wherein the amount of fuel supplied to the engine is feedback-controlled based on a correction value for correcting the air-fuel ratio, determined according to an output signal from this sensor, has also been proposed by the assignee of the present application (Japanese Patent Application No. 2-142825).

According to this proposed method of detecting deterioration of an exhaust gas component concentration sensor, the deviation between the output signal from the sensor and a predetermined reference value outside the output range of the sensor that can be assumed when it is functioning normally is integrated, and the deterioration of the sensor is assessed by comparing the integral value with a predetermined deterioration reference value.

If however the amount of fuel remaining in the fuel tank decreases, problems arise with the above conventional method as follows.

In the aforementioned method of detecting deterioration of a three-way catalyst, the catalyst is judged to have deteriorated if the difference between the first and second areas is smaller than a predetermined value, and at the same time if the temperature of the three-way catalyst is lower than the second temperature. However, if the amount of fuel remaining decreases, there is a possibility of the fuel pump sucking in air in which case the air-fuel mixture supplied to the engine will be leaner.

In general, when the air-fuel mixture becomes learner, the catalyst temperature rises. If the amount of fuel remaining decreases, therefore, the catalyst temperature will rise to exceed the second temperature, and there was thus a risk that the three-way catalyst could be judged to be functioning normally when in fact it had deteriorated.

Further, in the method of detecting deterioration of an exhaust gas component concentration sensor, if the amount of fuel remaining decreases and the gas mixture becomes leaner, the output signal from the sensor tends towards the lean side, so that the accuracy of detecting deterioration by comparing the integral value with the predetermined deterioration reference value, declines.

In addition, there are other problems in the technology of the prior art apart from those described above.

When air is sucked in from the fuel pump due to a decline in the amount of fuel remaining, insufficient fuel is supplied to the engine and the engine speed temporarily falls. In a method to detect abnormality of the ignition system wherein ignition failure in the cylinder is detected by monitoring a change in engine speed, therefore, there was a risk that ignition failure might be judged to have occurred when in fact it had not.

Similarly, in a method to detect abnormality of the fuel supply system by monitoring a change in the value of an air-fuel ratio correction coefficient set value of an air-fuel ratio correction coefficient set according to an output signal from an exhaust gas component concentration sensor, abnormality could not be detected accurately due to a temporary insufficiency in the fuel supply caused by a decrease in the amount of fuel remaining in the fuel tank.

Further, in a method to detect abnormality in an evaporative fuel-purging system by monitoring the amount of evaporative fuel purged into the intake system from a change in the value of an air-fuel ratio correction coefficient, abnormalities could not be detected accurately as the amount of evaporative fuel generated in the fuel tank decreased due to a decrease in the amount of fuel remaining therein.

SUMMARY OF THE INVENTION

It is the object of the invention to provide a method of detecting abnormality in an internal combustion engine wherein a decline of detection accuracy when the amount of fuel remaining in the fuel tank decreases, is prevented.

To attain the above object, the present invention provides a method of detecting abnormality in an internal combustion engine having a catalyst system, an evaporative fuel-purging system, a fuel supply system, an air-fuel ratio sensor, an ignition system, and a fuel tank, the method being applied to at least one of said catalyst system, said air-fuel ratio sensor, and said ignition system, for performing detection of abnormality therein according to operating parameters of said engine.

The method according to the invention comprising the following steps:

(1) detecting an amount of residual fuel in said fuel tank;
(2) comparing said amount of residual fuel with a predetermined value; and
(3) inhibiting said abnormality detection when, as a result of said comparison, said amount of residual fuel is below said predetermined value.

The above and other object, features and advantages of the invention will become more apparent from the ensuing detailed description taken in conjunction with the accompanying drawings.

BRIEF DESCRIPTION OF THE DRAWINGS

FIG. 4 is a view useful in explaining the control of FIG. 3;

FIGS. 9a-9c are views useful in explaining the control of FIG. 8;

DETAILED DESCRIPTION

The invention will now be described in detail with reference to the drawings showing embodiments thereof.

Figure 1:
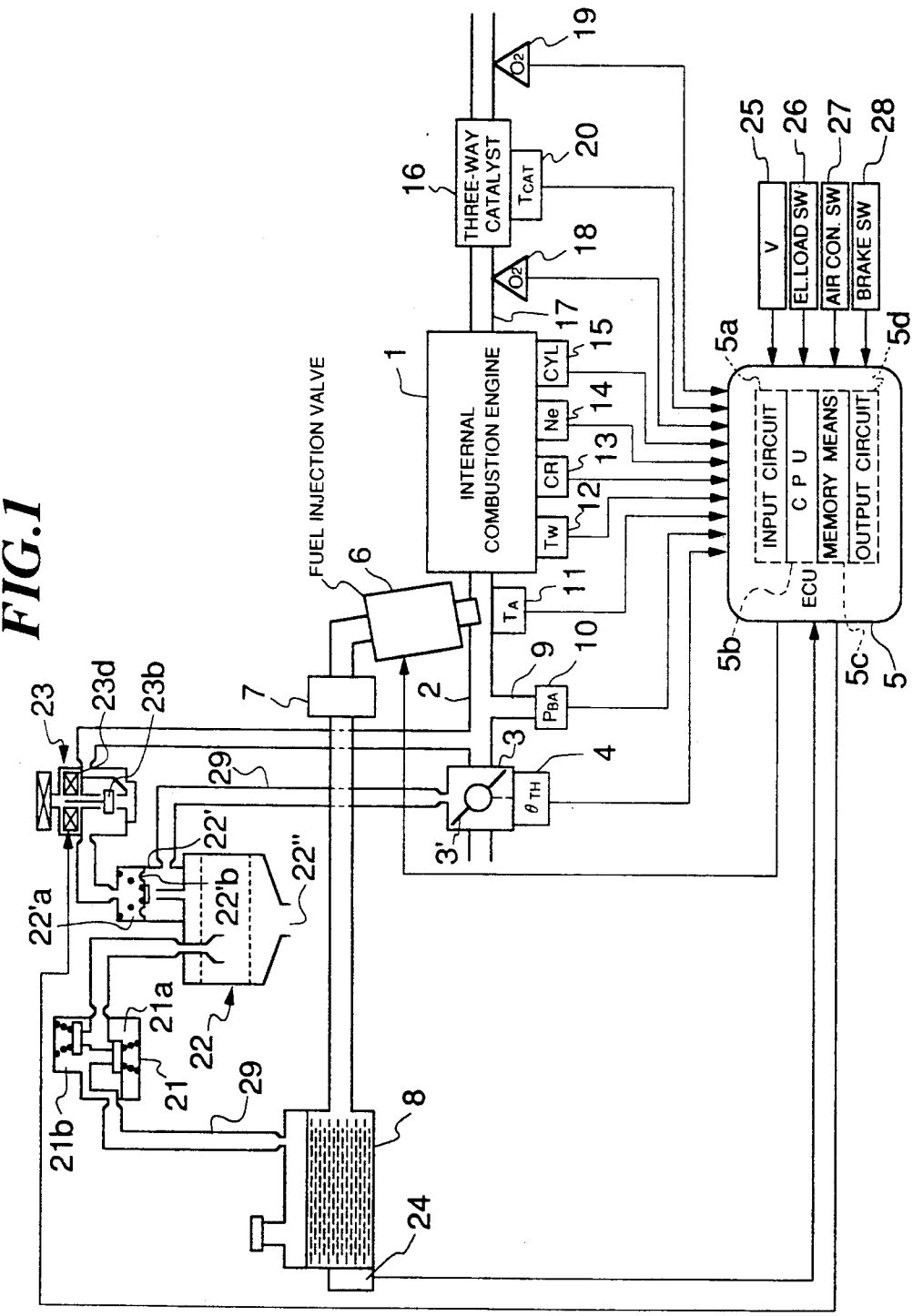
FIG. 1 is a block diagram of an internal combustion engine, to which the method according to the invention is applied.

FIG. 1 shows the whole arrangement of an internal combustion engine to which the abnormality detection method of the invention is applied.

In the figure, reference numeral 1 designates an internal combustion engine which is a four-cylinder type, for example. A throttle body 3 is provided in an intake pipe 2 of the engine 1, and a throttle valve 3' is disposed in the throttle body. A throttle valve opening ($\theta_{TH}$) sensor 4 is connected to the throttle valve 3', and supplies an electrical signal depending on the opening of the throttle valve 3' to an electronic control unit 5 (referred to hereinafter as the ECU).

A fuel injection valve 6 is provided for each engine cylinder and arranged at a location between the engine 1 and the throttle valve 3' slightly upstream of an intake valve, not shown, in the intake pipe 2. These fuel injection valves are connected to a fuel tank 8 via a fuel pump 7. They are electrically connected to the ECU 5, and their opening periods are controlled by signals therefrom.

An intake pipe absolute pressure ($P_{BA}$) sensor 10 is arranged immediately downstream of the throttle valve 3' in communication with the interior of the intake pipe 2 via a conduit 9 for supplying an electrical signal indicative of the sensed absolute pressure to the ECU 5. Further, an intake temperature ($T_A$) sensor 11 is arranged further downstream for supplying an electrical signal indicative of the sensed intake temperature $T_A$ to the ECU 5.

An engine coolant temperature ($T_W$) sensor 12, which may be formed of a thermistor or the like, is mounted in the cylinder block of the engine 1 for supplying an electrical signal indicative of the sensed engine coolant temperature $T_W$ to the ECU 5. A crank angle sensor 13, an engine rotational speed (Ne) sensor 14, and a cylinder-discriminating (CYL) sensor 15 are arranged in facing relation to a camshaft or a crankshaft of the engine 1, none of which is shown. The crank angle sensor 13 generates a signal pulse whenever the crankshaft rotates through a predetermined angle (e.g. 30°). The engine rotational speed sensor 14 generates a signal pulse (referred to hereinafter as a TDC signal pulse) at predetermined crank angles whenever the crankshaft of the engine 1 rotates through 180°. The cylinder-discriminating sensor 15 generates a signal pulse at a predetermined crank angle of a particular cylinder. All these signal pulses are supplied to the ECU 5, which computes the engine speed Ne based on the TDC signal pulses.

A three-way catalyst (CAT) 16 is arranged within an exhaust pipe 17 of the engine 1 to purify noxious components of the exhaust gases such as HC, CO and $NO_X$. $O_2$ sensors 18, 19 as exhaust gas component concentration sensors are mounted in the exhaust pipe 17 respectively upstream and downstream of the three-way catalyst 16 for sensing the oxygen concentration present in the exhaust gases, and supplying signals indicative of detection values $V_{O2F}$, $V_{O2R}$ to the ECU 5. Further, a temperature sensor 20 is mounted on the three-way catalyst 16 for sensing its temperature, and supplying a signal indicative of the sensed temperature $T_{CAT}$ to the ECU 5.

A conduit line (purging passage) 29 extends from an upper space in the fuel tank 8 and opens into the intake pipe 2 (in the illustrated embodiment, into the throttle body 3 at a location in the vicinity of the position of the throttle valve 3' when it is fully closed). An evaporative fuel-purging system (evaporative emission control system) is arranged across the conduit line, comprising a two-way valve 21, a canister 22 having a purge cut valve 22', and a purge control valve 23 which has a solenoid 23a for driving the valve body 23b and is connected to both the atmosphere and the intake pipe 2. The solenoid 23a of the purge control valve 23 is connected to the ECU 5, and controlled by a signal supplied therefrom such that the control valve 23 selectively supplies negative pressure or atmospheric pressure to a negative pressure chamber 22'a of the purge cut valve 22' defined by a diaphragm 22'b to thereby open and close the valve 22'. More specifically, evaporative fuel or gas (merely referred to hereinafter as "evaporative fuel") generated within the fuel tank 8 forcibly opens a positive pressure valve 21a of the two-way valve 21 when the pressure of the evaporative fuel reaches a predetermined level to flow through the valve 21 into the canister 22, where the evaporative fuel is adsorbed by an adsorbent in the canister and thus stored therein.

Meanwhile, when the solenoid is energized by the control signal from the ECU 5, the purge control valve 23 supplies atmospheric pressure to the purge cut valve 22' to close same, whereas when the solenoid is deenergized, the purge control valve 23 supplies negative pressure from the intake pipe 2 to the purge cut valve 22' to open same, whereby evaporative fuel temporarily stored in the canister 22 flows therefrom together with fresh air introduced through an outside air-introducing port 22'', through the purging passage 29 and the throttle body 3 into the intake pipe 2 to be supplied to the cylinders. When the fuel tank 8 is cooled due to low ambient temperature, etc., so that negative pressure increases within the fuel tank 8, a negative pressure valve 21b of the two-way valve 21 is opened to return evaporative gas temporarily stored in the canister 18 to the fuel tank 8. In the above described manner, the evaporative fuel generated within the fuel tank 8 is prevented from being emitted into the atmosphere.

The fuel tank 8 is provided with a residual fuel sensor 24 to detect the amount of fuel remaining in the tank, and supply an electrical signal indicative of the detected fuel amount value of the ECU 5.

Further connected to the ECU 5 are a vehicle speed sensor 25 for detecting the travel speed V of a vehicle on which the engine 1 is installed, an electrical load switch sensor 26 for detecting on/off states of operating switches of electrical devices installed on the vehicle such as headlights which act as loads on the engine, an air conditioner switch sensor 27 for detecting the on/off state of the operating switch of an air conditioner installed on the vehicle, and a brake switch sensor 28 for detecting the on/off state of a brake switch which turns on when the brake is actuated. Output signals from these sensors are supplied to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth; a central processing unit (referred to hereinafter as "the CPU") 5b which carries out failure detecting programs described hereinafter; a memory means 5c storing a Ti map referred to hereinafter, various operational programs executed in the CPU 5b and the results of calculations therefrom, and an output circuit 5d which outputs driving signals to the fuel injection valves 6 and the purge control valve 23.

The CPU 5b, based on the above-mentioned signals from the sensors, determines the conditions under which the engine 1 is operating, such as an air-fuel ratio feedback control region in which the fuel supply is controlled in response to the oxygen concentration detected in the exhaust gases, and open-loop control regions such as a fuel supply cut-off (fuel cut) region in which the fuel supply is cut off, and a high load (WOT) region, and computes the fuel injection period $T_{OUT}$ of the fuel injection valves 6 in synchronism with TDC signal pulses based on the following equation (1):

$$T_{OUT} = Ti \times K_1 \times K_{WOT} \times K_{O2} + K_2 \quad (1)$$

where

Ti represents a basic value of the fuel injection period $T_{OUT}$ of the fuel injection valves 6 which is read from the Ti map set in accordance with the engine rotational speed Ne and the intake pipe absolute pressure $P_{BA}$.

$K_{O2}$ represents an air-fuel ratio feedback correction coefficient whose value is determined in response to the oxygen concentration in the exhaust gases detected by the upstream $O_2$ sensor 18 during feedback control, while it is set to appropriate predetermined values while the engine is in predetermined operating regions (the open-loop control regions) other than the feedback control region. The correction coefficient $K_{O2}$ is calculated in the following manner. The output level $V_{O2F}$ of the up stream $O_2$ sensor 18 is compared with a predetermined reference value. If the output level $V_{O2F}$ is inverted with respect to the predetermined reference value, the correction coefficient $K_{O2}$ is calculated by a known proportional control method where a proportional term (P-term) is added to or subtracted from the $K_{O2}$ value, whereas if the former is uninverted, it is calculated by a known integral control method where an integral term (I-term) is added to or subtracted from the $K_{O2}$ value. The manner of calculation of the correction coefficient $K_{O2}$ is disclosed for example in Japanese Provisional Patent Publications (Kokai) No. 57-137633 and 63-189639.

$K_{WOT}$ is a fuel supply-increasing coefficient set to a value larger than 1.0 when the engine is in the high load (WOT) region.

$K_1$ and $K_2$ represent other correction coefficients and correction variables respectively which are calculated, based on various engine parameter signals, to such values as to optimize engine characteristics such as fuel consumption and accelerability, depending on engine operating conditions.

The CPU 5b supplies the fuel injection valves 6 with driving signals through the output circuit 5d corresponding to the calculated fuel injection period $T_{OUT}$ determined as above during which the fuel injection valves 6 are opened.

The method of detecting abnormality of an internal combustion engine of the invention will now be explained with reference to the control program flowchart shown in FIG. 2. This program is executed by the CPU 5 as background processing.

First, at a step 101, it is determined whether or not the amount of fuel remaining in the fuel tank 8 detected by the residual fuel sensor 24 is below a predetermined value (e.g. 10 lit.). This determination can normally be made according to the presence or absence of a lamp driving signal for a residual fuel warning lamp which lights when the residual fuel in the fuel tank 8 has decreased to a small amount.

If the answer at the step 101 is negative (No), the program is terminated. If on the other hand the answer is affirmative (Yes), i.e. if the amount of residual fuel is below a predetermined value, the program proceeds to a step 102, where flags $F_{-CATSTP}$, $F_{-MISFSTP}$, $F_{-O2STP}$, $F_{-FUELSTP}$ and $F_{EVAPSTP}$ which are used in detecting abnormalities in various control systems and devices described hereinafter are set to 1 (these flags are all first initialized to 0), and the program is terminated.

The method of detecting abnormalities of various systems or devices in this internal combustion engine will now be described with reference to FIG. 3 to FIG. 11.

Figure 3A:
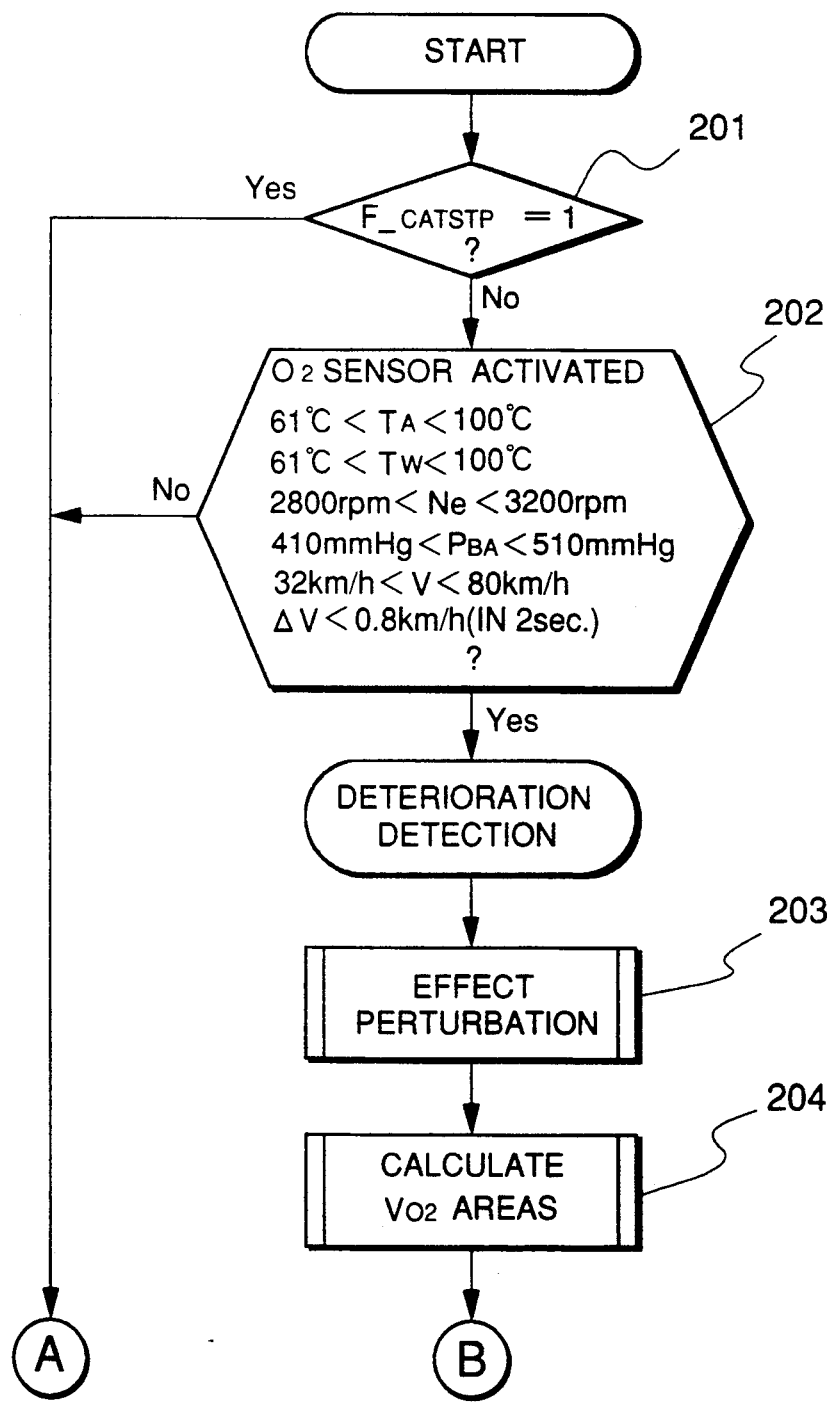
FIGS. 3a and 3b are flowcharts of a program for detecting deterioration of a three-way catalyst.
Figure 3B:
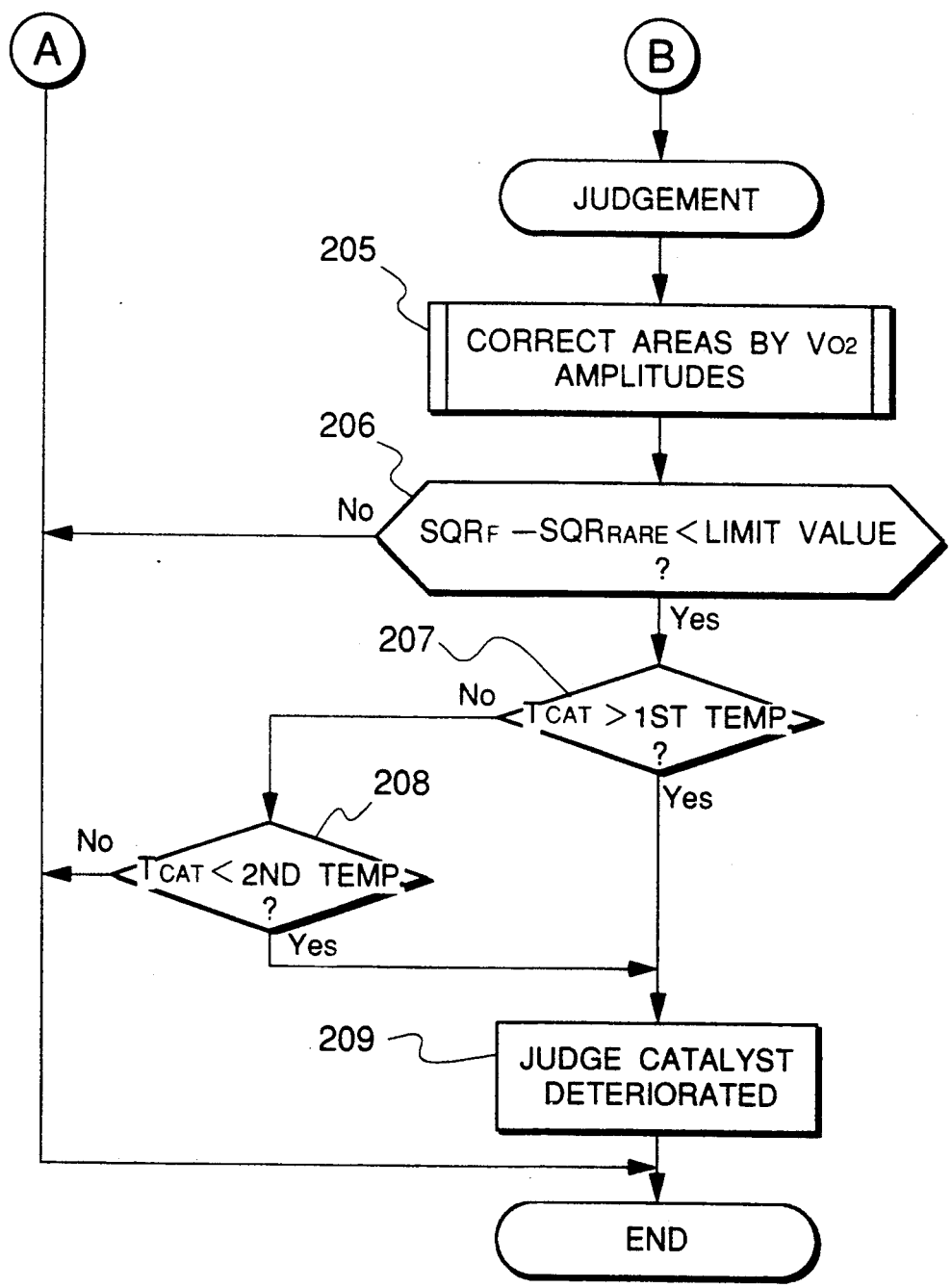

FIGS. 3a and 3b are a program flowchart outlining a method of detecting abnormality of the three-way catalyst of the engine 1. This method has already been proposed by the assignee of the present application (Japanese Patent Application No. 2-117890; U.S. Ser. No. 07/694,831 filed May 2, 1991, still pending).

Figure 2:
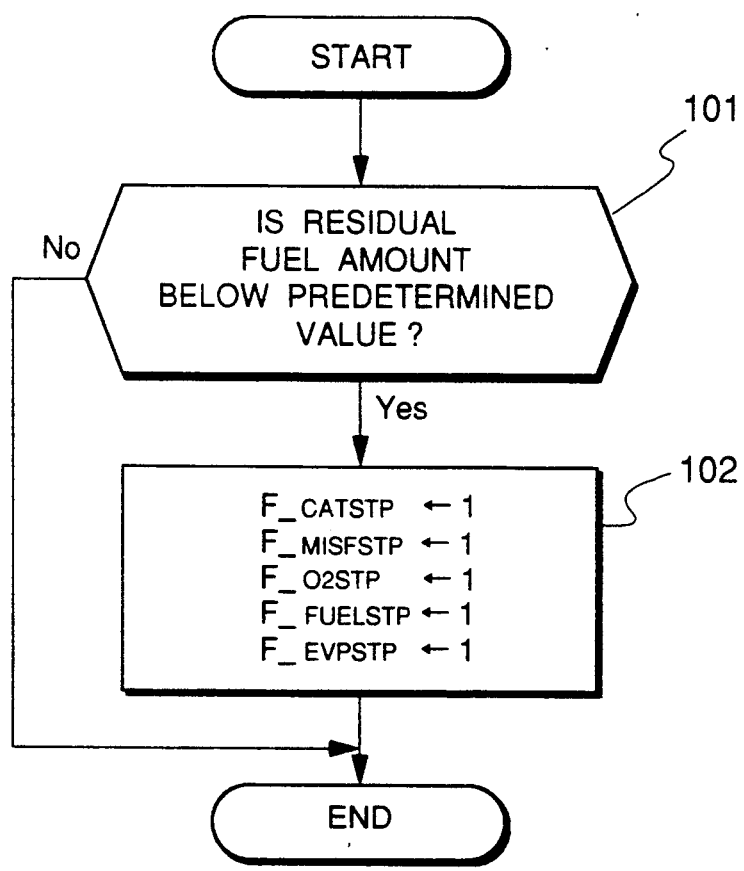
FIG. 2 is a flowchart of a program for detecting abnormality in a control unit of an internal combustion engine, according to the method of the invention, which is executed by a CPU 5b of FIG. 1.

First, at a step 201, it is determined whether or not the above-mentioned flag $F_{-CATSTP}$ which was set by the program of FIG. 2 is equal to 1. If the answer is affirmative (Yes), it is judged that the deterioration detection is not being performed accurately due to the small amount of residual fuel, and the program is terminated without performing the detection of a step 202 and subsequent steps.

If on the other hand the answer is negative (No), the program proceeds to the step 202, where it is determined whether or not the operating condition of the engine is suitable for performing the deterioration detection. This is done by determining whether or not the upstream O₂ sensor 18 and the downstream O₂ sensor 19 are activated, whether or not the intake temperature $T_A$ is within a predetermined range (e.g. 61° C.<$T_A$<100°), whether or not the engine coolant temperature $T_W$ is within a predetermined range (e.g. 61° C.<$T_W$<100°), whether or not the engine rotational speed Ne is within a predetermined range (e.g. 2800 rpm<Ne<3200 rpm), whether or not the absolute pressure in the intake pipe $P_{BA}$ is within a predetermined range (e.g. 410 mm Hg<$P_{BA}$<510 mm Hg), whether or not the travel speed of the vehicle V is within a predetermined range (e.g. 32 Km/h<V<80 Km/h), and whether or not the change ΔV of vehicle speed V in 2 seconds is smaller than for example 0.8 Km/h.

If the answer to any of the questions at step 202 is negative (No), it is judged that the engine operating condition is unsuitable for performing the deterioration detection, and the program is terminated. If on the other hand the answers to all the questions at the step 202 are affirmative (Yes), the program proceeds to steps 203 and 204, and detection of deterioration of the three-way catalyst 16 is performed. This will be described hereinafter with reference to FIG. 4.

First, average values $V_{CHKFL}$, $V_{CHKRL}$ of the respective output values $V_{O2F}$, $V_{O2R}$ from the upstream and downstream O₂ sensors 18, 19 are calculated while the engine is operating in the fuel cut (F/C) region, and average values $V_{CHKFH}$, $V_{CHKRH}$ of same while the engine is operating in the high load (WOT) region (FIG. 4).

When the automotive vehicle has continuously been crusing for a predetermined time period, and the engine is in a predetermined operating condition, the air-fuel ratio correction coefficient $K_{O2}$ is subjected to perturbation, e.g. the value of the correction coefficient $K_{O2}$ is repeatedly inverted about its average value between ±4 to 10% thereof at time intervals of 0.5 seconds. By the perturbation carried out in the above manner, exhaust gases having a periodically changing oxygen concentration are emitted from the engine 1, and this changing oxygen concentration is detected by the O₂ sensors 18, 19 (FIG. 4).

Based on the output values $V_{O2F}$, $V_{O2R}$ of the O₂ sensors 18, 19 and average values $V_{CHKFL}$, $V_{CHKRL}$, $V_{CHKFH}$, $V_{CHKRH}$ thus obtained, an area $SQR_F$ defined between $V_{O2F}$, $V_{CHKFL}$ and $V_{CHKFH}$, and an area $SQR_R$ defined between $V_{O2R}$, $V_{CHKRL}$ and $V_{CHKRH}$ are respectively calculated (step 204, FIG. 4), over a predetermined time period $t_{MES}$ from a time point where the coefficient $K_{O2}$ begins to rise during perturbation (FIG. 4). The calculation of the areas is repeated during perturbation of the correction coefficient $K_{O2}$.

Next, the respective fluctuation amplitudes $DELTA_F$, $DELTA_R$ of the output values of the upstream and downstream O₂ sensors 18 and 19 are calculated using the average values $V_{CHKFL}$, $V_{CHKRL}$, $V_{CHKFH}$, $V_{CHKRH}$ according to the following equations (2) and (3):

$$DELTA_F = V_{CHKFH} - V_{CHKFL} \quad (2)$$

$$DELTA_R = V_{CHKRH} - V_{CHKRL} \quad (3)$$

The area $SQR_R$ found in the step 204 is then corrected using these amplitudes according to the following equation (4) to a modified value $SQR_{RARE}$ (step 205):

$$SQR_{RARE} = SQR_R \times \frac{DELTA_F}{DELTA_R} \quad (4)$$

It may be the that the modified valve $SQR_{RARE}$ thus calculated is a value where differences or variations in the output characteristics between the upstream and downstream O₂ sensors 18, 19 contained in $SQR_R$, have been eliminated.

If the deviation between the areas $SQR_F$, $SQR_{RARE}$ thus obtained is greater than a predetermined limit value (the answer at a step 206 is negative), it is judged that the three-way catalyst 16 has been not degraded, and the program is terminated. If on the other hand the deviation is smaller than the predetermined limit value (the answer at the step 206 is affirmative), the catalyst temperature $T_{CAT}$ is compared to a first temperature exhibited by the catalyst 16 when the HC purifying percentage is 50%, and a second temperature exhibited by the catalyst 16 depending on engine load (steps 207, 208). If the answer at the step 207 is affirmative (Yes), or the answer at the step 207 is negative (No) and at the same time the answer at the step 208 is affirmative (Yes), it is judged that the catalyst has been degraded (step 209). If on the other hand the answers at both steps 207 and 208 are negative (No), it is judged that the deterioration has not occurred, and the program is terminated.

Figure 5:
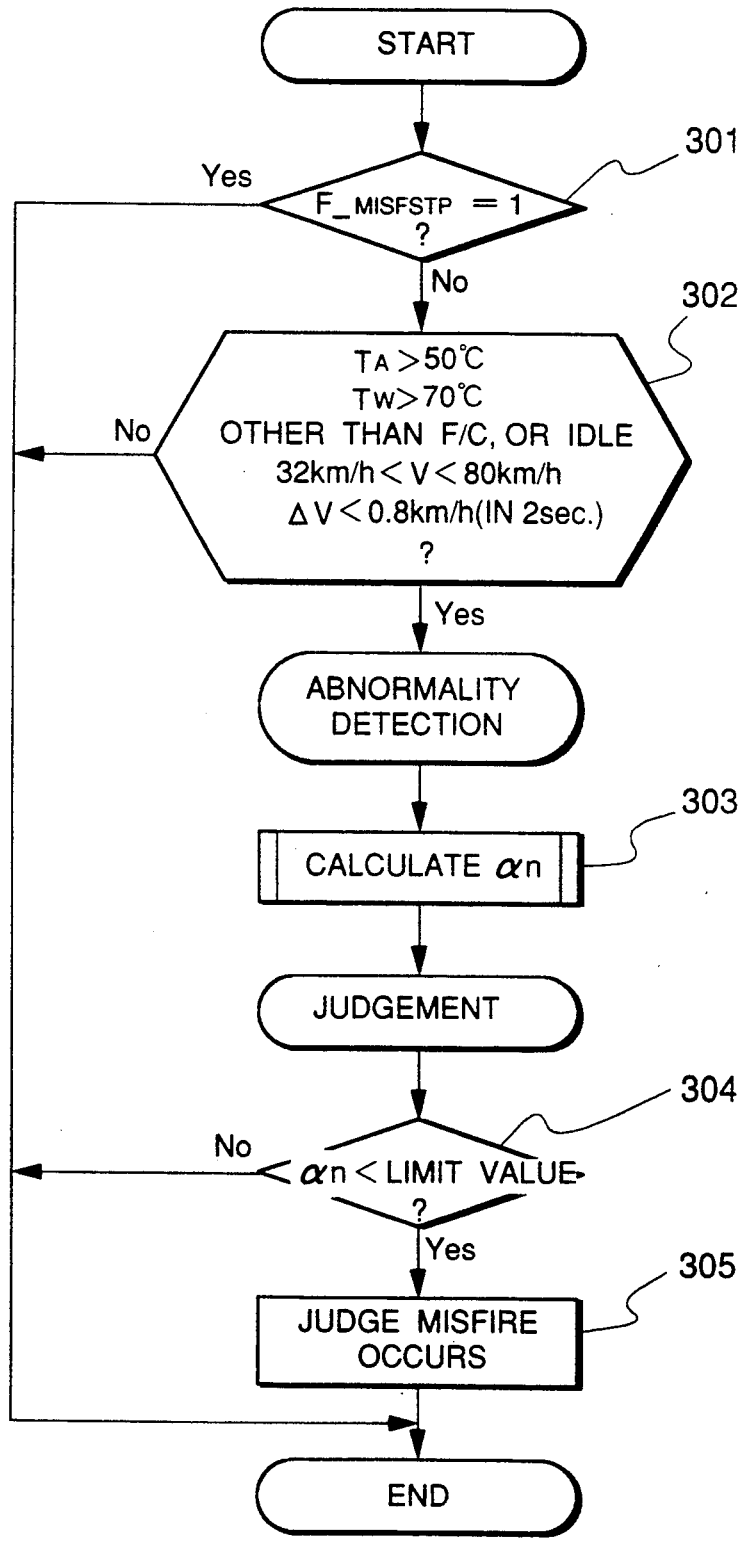
FIG. 5 is a flowchart of a program for detecting deterioration of an exhaust gas concentration sensor.

FIG. 5 is a program flowchart illustrating an outline of a method to detect combustion abnormalities (ignition failure) in the ignition system of the engine 1. A "device for detecting combustion abnormalities in an internal combustion engine" applying this method was proposed by the assignee of the present application in Japanese Patent Application No. 2-196516 Jul. 25, 1990.

First, at a step 301, it is determined whether or not the aforementioned flag $F_{-MISFSTP}$ set in the program of FIG. 2 is equal to 1. If the answer is affirmative (Yes), it is judged that the detection of ignition failure is not being performed accurately due to the small amount of residual fuel, and the program is terminated without performing the detection of step 302 and subsequent steps.

If on the other hand the answer at the step 301 is negative (No), the program proceeds to a step 302, where it is determined whether or not the operating condition of the engine is suitable for performing the detection of ignition failure. This is done by determining whether or not the intake temperature $T_A$ is higher than a predetermined value (e.g. 50° C.), whether or not the engine coolant temperature $T_W$ is higher than a predetermined value (e.g. 70° C.), whether or not the engine 1 is in a region other than the fuel cut (F/C) region or in the idle region, whether or not the travel speed of the vehicle V is within a predetermined range (e.g. 32 Km/h<V<80 Km/h), and whether or not the change V of vehicle speed V in 2 seconds is smaller than for example 0.8 Km/h.

If the answer to any of the questions at the step 302 is negative (No), it is judged that the engine operating condition is unsuitable for performing the ignition failure detection, and the program is terminated. If on the other hand the answers to all the questions at the step 302 are affirmative (Yes), the program proceeds to a step 303, where ignition failure detection is performed.

First, the time interval between TDC signal pulses generated is measured. If the time interval between present and previous TDC signal pulses is tn (where the number n denotes the current pulse, and for example, n−1 denotes the immediately preceding pulse and n−2 denotes the pulse immediately before that), average angular velocity n of the crankshaft in the interval is given by the following equation (5):

$$\omega n = \frac{\pi}{tn} \quad (5)$$

The angular acceleration of the crankshaft $\alpha n$ can therefore be calculated by the following equation (6) (step 303):

$$\alpha n = \frac{\omega n - \omega n_{n-1}}{\frac{t_n + t_{n-1}}{2}} \quad (6)$$

In this method of detecting ignition failure, this angular acceleration $\alpha n$ is monitored (step 304). More specifically, an average value of this angular acceleration $\alpha_{AVE}$ is calculated up to the immediately preceding pulse by the following equation (7):

$$\alpha_{AVE} = \frac{\alpha_{n-4} + \alpha_{n-3} + \alpha_{n-2} + \alpha_{n-1}}{4} \quad (7)$$

The difference $\Delta \alpha n$ between this calculated average value $\alpha_{AVE}$ and the present angular acceleration $\alpha n$ is then calculated by the following equation (8):

$$\Delta \alpha n = \alpha n - \alpha_{AVE} \quad (8)$$

If this calculated difference $\Delta \alpha n$ is negative, and if this $\Delta \alpha n$ is smaller than a predetermined negative value [($\alpha_{AVE}$+the predetermined value) corresponds to a limit value] (in other words, if the absolute value of the difference $\Delta \alpha n$ is greater than the absolute value of this predetermined value), it is judged that ignition failure has occurred in a cylinder where ignition should have occurred between the present pulse and the immediately preceding pulse (step 305).

Detection and judging of ignition failure shown in the above steps 303, 304 and 305 may also be performed by a method already proposed by the assignee of the present application (Japanese Patent Application No. 2-89436). An outline of this method is given below.

The time intervals between pulses generated by the crank angle sensor 13 are added from the time point at which each TDC signal pulse is generated until after the crankshaft has rotated through 90° so as to obtain a time T. A rotation fluctuation percentage is then calculated by the following equation (9):

$$\text{Rotation fluctuation percentage} = \frac{\text{Last } T - \text{Present } T}{\text{Present } T} \quad (9)$$

If this calculated rotation fluctuation percentage is smaller than a negative predetermined limit, it is judged that ignition failure has occurred.

Figure 6:
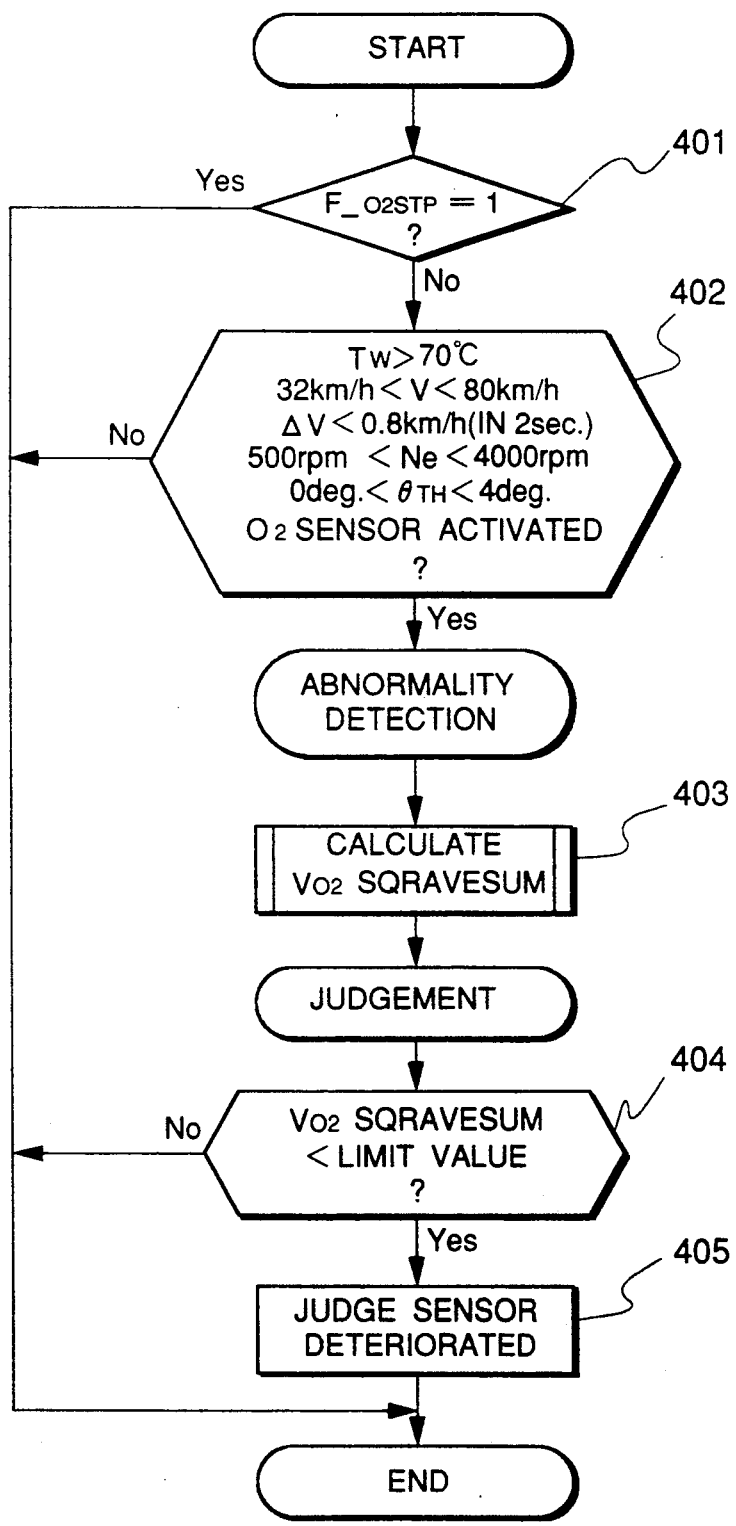
FIG. 6 is a flowchart of a program for detecting deterioration of an exhaust gas component concentration sensor.

FIG. 6 is a program flowchart outlining a method of detecting deterioration of the exhaust gas concentration sensors in the engine 1, and more particularly of the upstream O₂ sensor 18. This method has already been proposed by the assignee of the present application (Japanese Patent Application No. 2-142825; U.S. Ser. No. 07/535,842 filed Jun. 11, 1991, now U.S. Pat. No. 5,052,361). In the following description of this method with reference to the FIG. 6 flowchart, the output value of upstream O₂ sensor 18 will be referred to as $V_{O2}$.

First, at a step 401, it is determined whether or not the aforementioned flag $F_{-O2STP}$ set in the program of FIG. 2 is equal to 1. If the answer is affirmative (Yes), it is judged that the accuracy of the deterioration detection has decreased due to the small amount of residual fuel, and the program is terminated without performing the detection of a step 402 and subsequent steps.

If on the other hand the answer at the step 401 is negative (No), the program proceeds to the step 402, and it is determined whether or not the operating condition of the engine is suitable for performing the deterioration detection. This is done by determining whether or not the engine coolant temperature $T_W$ is higher than a predetermined value (e.g. 73.3° C.), whether or not the travel speed of the vehicle V is within a predetermined range (e.g. 32 Km/h<V<80 Km/h), whether or not the change $\Delta V$ of vehicle speed V in 2 seconds is smaller than for example 0.8 Km/h, whether or not the engine rotational speed Ne is within a predetermined range (e.g. 500 rpm<Ne<4000 rpm), whether or not the throttle valve opening is within a predetermined range (e.g. 0°<$\theta$TH<4°), and whether or not the upstream O₂ sensor 18 is activated.

If the answer to any of the questions at the step 402 is negative (No), it is judged that the engine operating condition is unsuitable for performing the deterioration detection (the conditions for deterioration detection not satisfied), and the program is terminated. If on the other hand the answers to all the questions at the step 402 are affirmative (Yes), the program proceeds to a step 403 to perform detection of deterioration of the upstream O₂ sensor 18. This will be described hereinafter with reference to FIG. 7.

Figure 7:
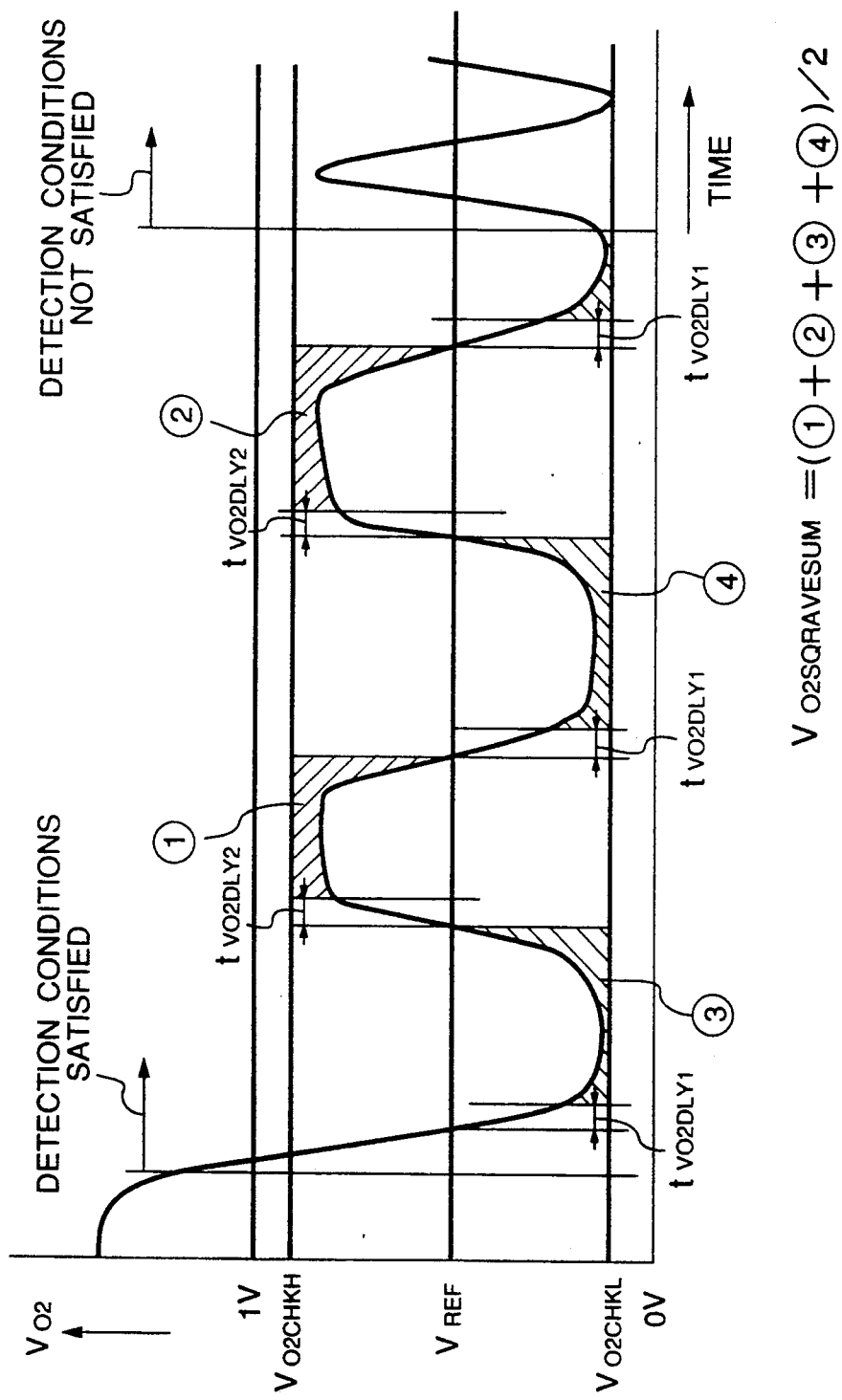
FIG. 7 is a view useful in explaining the control of FIG. 6.

The absolute value of the deviation between the output value $V_{O2}$ of the upstream O₂ sensor 18 and a lower limit reference value $V_{O2CHKL}$ which is a predetermined reference value outside the output range of the O₂ sensor 18 that can be assumed when it is functioning normally, $|V_{O2} - V_{O2CHKL}|$, is calculated, and integrated while the output valve $V_{O2}$ is no greater than a reference value $V_{REF}$ to give a lower area (shaded portions {1} and {3} of FIG. 7). In a similar way, the absolute value of the deviation between the output value $V_{O2}$ of the upstream O₂ sensor 18 and an upper limit reference value $V_{O2CHKH}$ which is a predetermined reference value outside the output range of the O₂ sensor 18 that can be assumed when it is functioning normally, $|V_{O2} - V_{O2CHKH}|$, is calculated, and integrated while the output value $V_{O2}$ is no less than the reference value $V_{REF}$ to give an upper area (shaded portion {2} and {4} of FIG. 7). The lower area calculation is however started with a delay by a predetermined time $t_{VO2DLY1}$, and the upper area calculation by a predetermined time $t_{VO2DLY2}$. This avoids fluctuations in calculated values of the lower and upper areas due to ingress of noise or other external disturbances in the fuel supply control system when the output value $V_{O2}$ is close to the reference value $V_{REF}$.

An average value $V_{O2SQRAVESUM}$ of one period of the sum of lower and upper areas is calculated (step 403), and it is determined whether or not this calculated average value $V_{O2SQRAVESUM}$ is greater than a predetermined limit value (step 404).

If the answer at the step 404 is negative (No), it is judged that deterioration of the upstream $O_2$ sensor 18 has not occurred, and the program is terminated. If on the other hand the answer at the step 404 is affirmative (Yes), it is judged that the deterioration has occurred (step 405), and the program is terminated.

Figure 8:
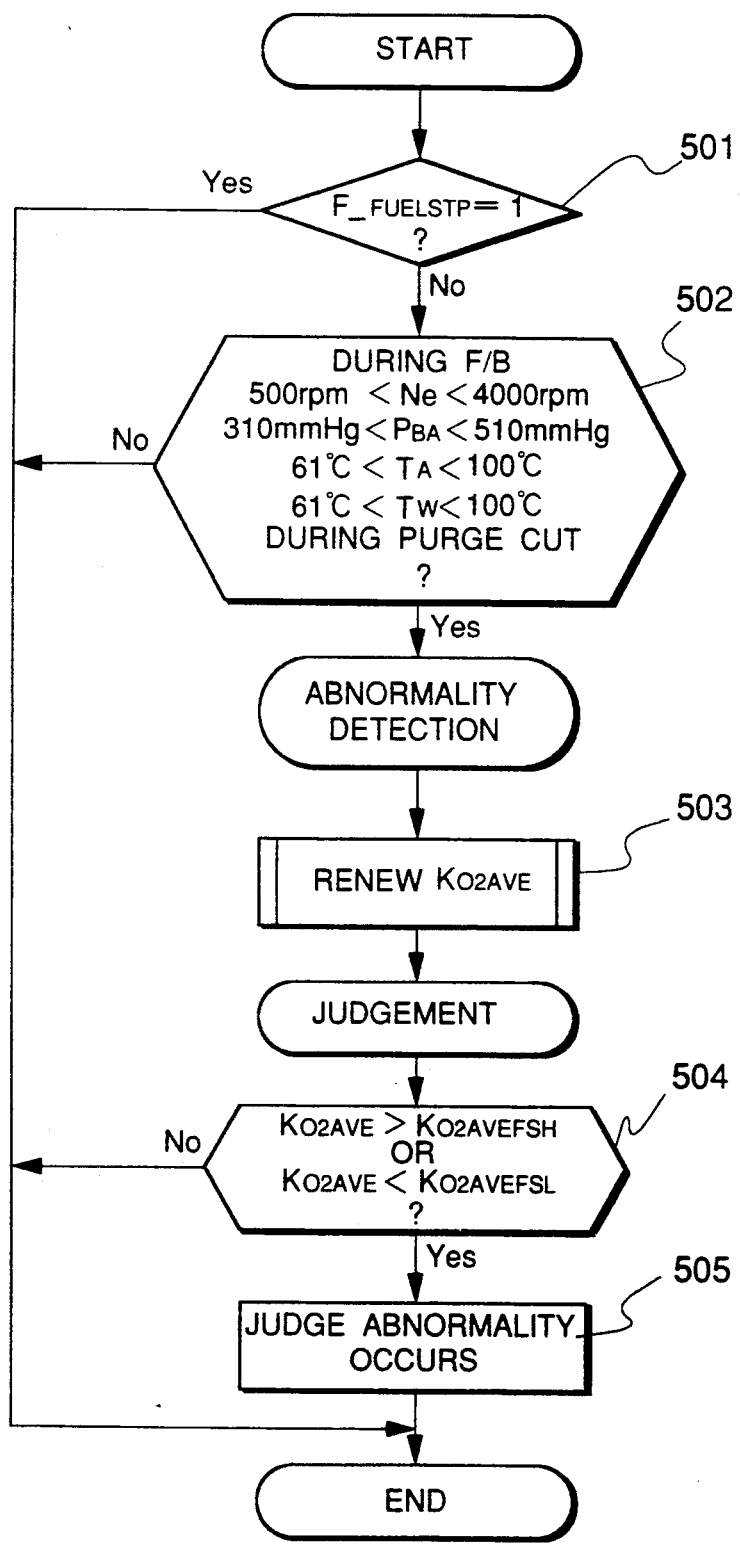
FIG. 8 is a flowchart of a program for detecting abnormality in a fuel supply system.

FIG. 8 is a program flowchart outlining a method of detecting abnormality in the fuel supply system of the engine 1. This method has already been proposed by the assignee of the present application (Japanese Patent Application No. 2-49080; U.S. Ser. No. 07/649,026 filed Feb. 1, 1991, now U.S. Pat. No. 5,070,847).

First, at a step 501, it is determined whether or not the aforementioned flag $F_{-FUELSTP}$ set in the program of FIG. 2 is equal to 1. If the answer is affirmative (Yes), it is judged that it is impossible to perform the abnormality detection accurately due to the small amount of residual fuel, and the program is terminated without performing the detection of a step 502 and subsequent steps.

If on the other hand the answer at the step 501 is negative (No), the program proceeds to a step 502, where it is determined whether or not the operating condition of the engine is suitable for performing the abnormality detection. This is done by determining whether or not air-fuel ratio feedback (F/B) control is being carried out, whether or not the engine rotational speed Ne is within a predetermined range (e.g. 500 rpm $<$ Ne $<$ 4000 rpm), whether or not the absolute pressure $P_{BA}$ in the intake pipe is within a predetermined range (e.g. 310 mm Hg $< P_{BA} <$ 510 mm Hg), whether or not the intake temperature $T_A$ is within a predetermined range (e.g. 61° C. $< T_A <$ 100°), whether or not the engine coolant temperature is within a predetermined range (e.g. 61° C. $< T_W <$ 100° C.), and whether or not purging of evaporative fuel from the canister 22 to the intake pipe 2 has been cut.

If the answer to any of the questions at the step 502 is negative (No), it is judged that the engine operating condition is unsuitable for performing the abnormality detection, and the program is terminated. If on the other hand the answers to all the questions at the step 502 are affirmative (Yes), the program proceeds to a step 503, and detection of abnormality in the fuel supply system is performed by monitoring a change in the value of the air-fuel ratio correction coefficient $K_{O2}$. This will be described hereinafter with reference to FIG. 9.

First, when a predetermined time period $T_{MCHKAVE}$ has elapsed after the engine entered a particular operating region, an integral valve $K_{AV}$ of the correction coefficient $K_{O2}$ which is an average learned value of $K_{O2}$ is calculated, and it is observed over a predetermined time interval $T_{EFM}$ whether or not this calculated integral value exceeds a range defined by $(K_{O2AVE} + \Delta K_{O2AVE})$ and $(K_{O2AVE} - \Delta K_{O2AVE})$.

As shown in FIG. 9(a), if the integral value $K_{AV}$ exceeds, for example, $(K_{O2AVE} + \Delta K_{O2AVE})$ within the predetermined time interval $T_{EFM}$, an abnormality judging coefficient $K_{O2AVE}$ of which the initial value is an average value of the correction coefficient $K_{O2}$ is updated to $(K_{O2AVE} + \alpha \Delta K_{O2AVE})$ (step 503). Subsequently, $K_{O2AVE}$ is not updated provided that the engine remains in this particular operating region, but if it shifts from this region to another region and then again enters a particular operating region, as shown in FIG. 9(b), the integral value $K_{AV}$ is calculated based on the updated value of $K_{O2AVE}$, and is compared to $(K_{O2AVE} \pm \Delta K_{O2AVE})$ based on this updated value. If then, for example, the integral value $K_{AV}$ exceeds $(K_{O2AVE} + \Delta K_{O2AVE})$, the coefficient $K_{O2AVE}$ is again updated to $(K_{O2AVE} + \alpha \Delta K_{O2AVE})$ based on the updated value of $K_{O2AVE}$.

The abnormality judging coefficient $K_{O2AVE}$ thus obtained is compared to upper and lower limit discriminating values $K_{O2AVEFSH}$, $K_{O2AVEFSL}$ (step 504). As shown in FIG. 9(c), if the coefficient $K_{O2AVE}$ exceeds for example the upper limit $K_{O2AVEFSH}$, and this situation continues for twice as long as a predetermined time period $T_{EKO2AVE}$ (the answer at the step 504 is affirmative), it is judged that an abnormality has occurred in the fuel supply system (step 505).

Figure 10A:
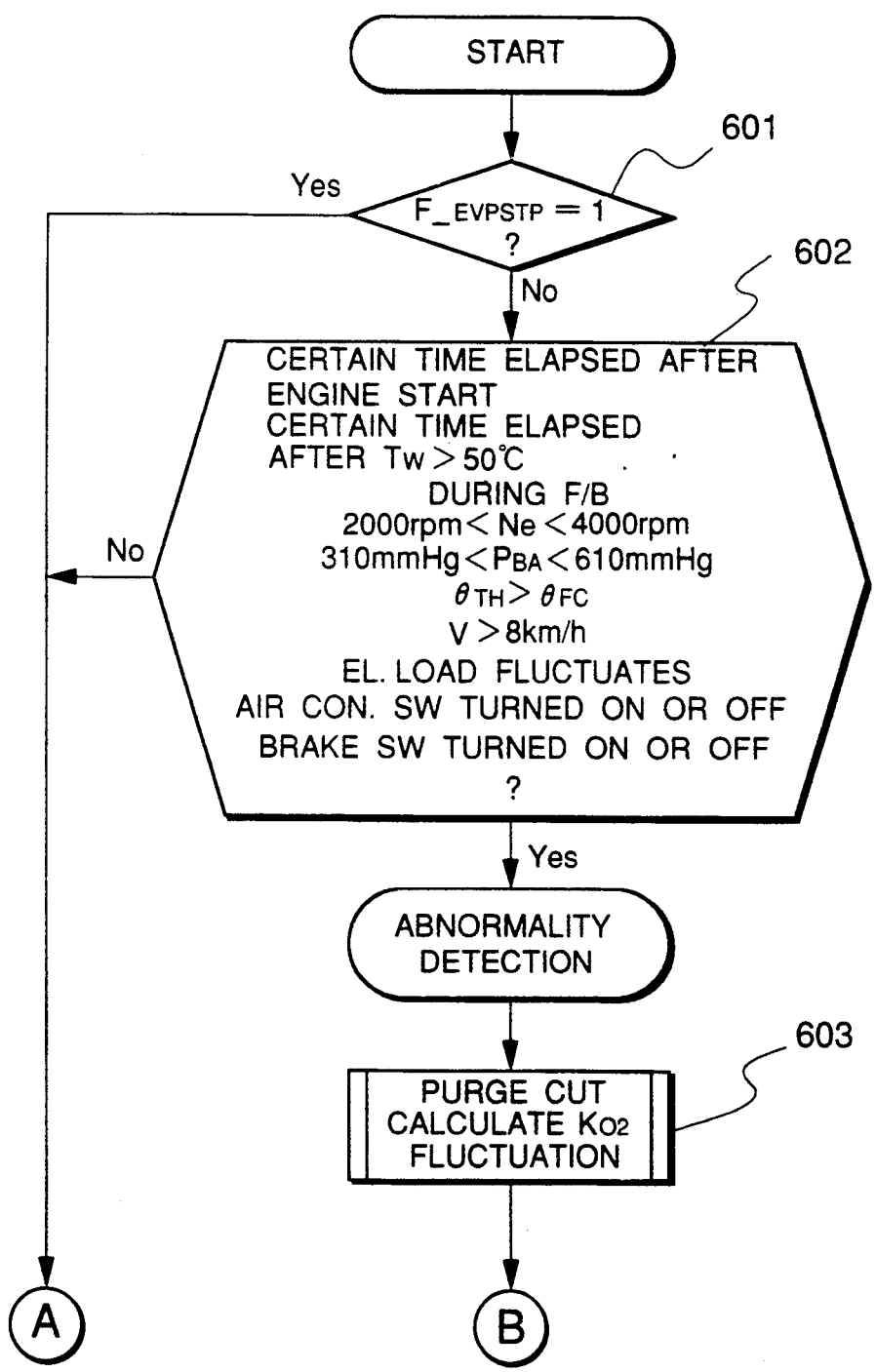
FIGS. 10a and 10b are flowcharts of a program for detecting abnormality in the evaporative fuel-purging system.
Figure 10B:
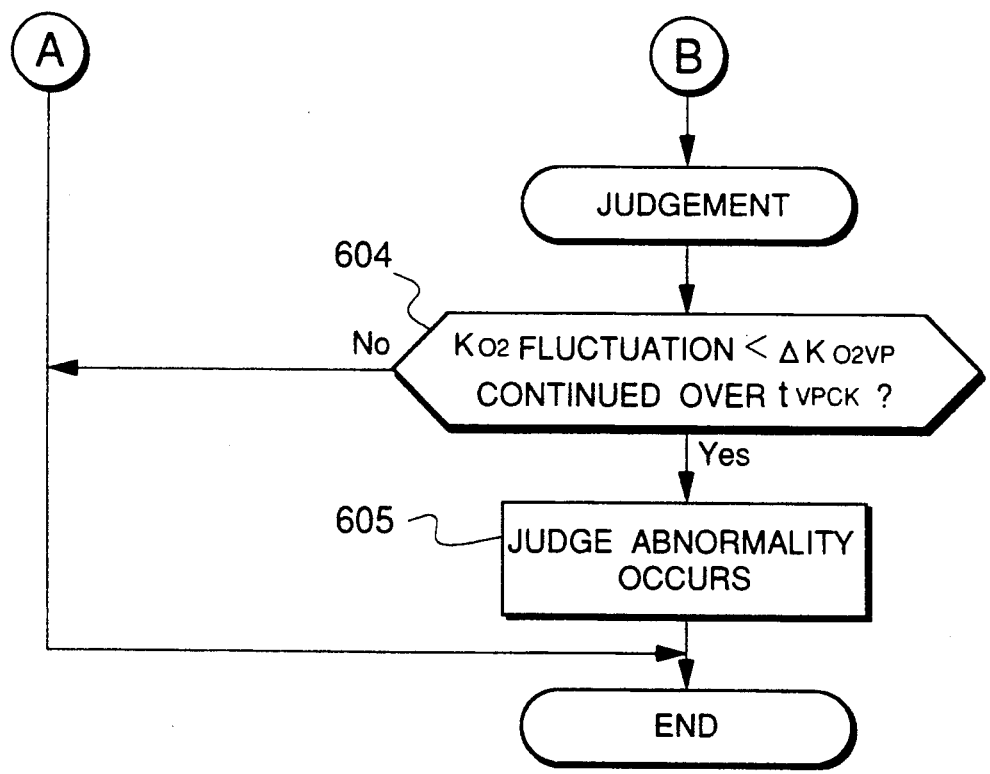
Figure 11:
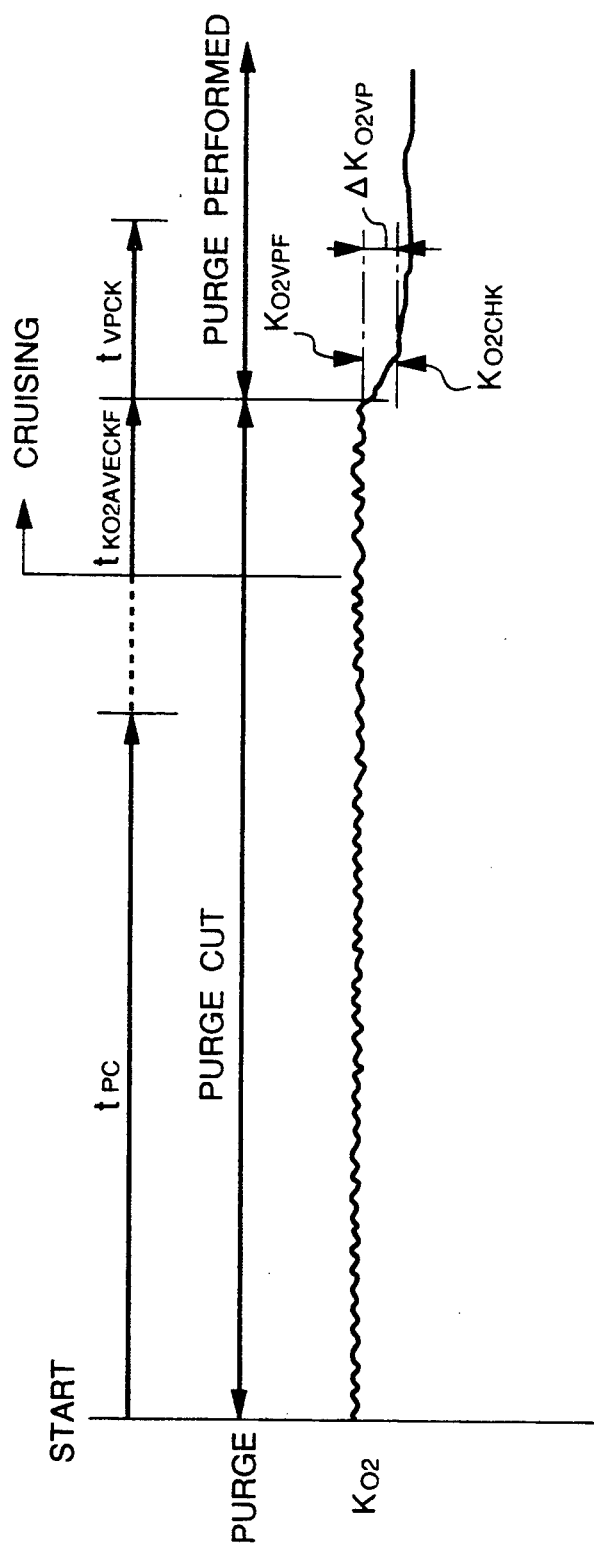
FIG. 11 is a view useful in explaining the control of FIG. 10.

FIGS. 10a and 10b are a program flowchart outlining a method of detecting abnormality in the evaporative fuel-purging system 21, 22 and 23 of the engine 1. This method has already been proposed by assignee of the present application in Japanese Patent Application No. 2-207414 (U.S. Ser. No. 07/681,937 filed Apr. 8, 1991, now U.S. Pat. No. 5,085,194).

First, at a step 601, it is determined whether or not the aforementioned flag $F_{-EVPSTP}$ set in the program of FIG. 2 is equal to 1. If the answer is affirmative (Yes), it is judged that it is impossible to perform the abnormality detection accurately due to the small amount of residual fuel, and the program is terminated without performing the detection of a step 602 and subsequent steps.

If on the other hand the answer at the step 601 is negative (No), the program proceeds to the step 602, where it is determined whether or not the operating condition of the engine is suitable for performing the abnormality detection. This is done by determining whether or not a certain time period has elapsed after the start of the engine 1, whether or not a certain time period has elapsed after the engine coolant temperature ($T_W$) rose above 50° C. from below 50° C., whether air-fuel ratio feedback (F/B) control is being carried out, whether or not the engine rotational speed Ne is within a predetermined range (e.g. 2000 rpm $<$ Ne $<$ 4000 rpm), whether or not the absolute pressure $P_{BA}$ in the intake pipe is within a predetermined range (e.g. 310 mm Hg $< P_{BA} <$ 610 mm Hg), whether or not the throttle valve opening $\theta_{TH}$ is greater than a predetermined value $\theta_{FC}$ at which fuel cut should be performed with the valve almost fully closed, whether or not the travel speed of the vehicle V is higher than for example 8 Km/h, whether or not there was a fluctuation of electrical load between the last time and the present time the program was executed as determined by the output of the electric load switch sensor 26, whether or not there was a fluctuation between the last time and the present time the program was executed when the air conditioner was turned from ON to OFF or from OFF to ON as determined by the output of the air conditioner switch sensor 27, and whether or not there was a fluctuation between the last time and the present time the program was executed when the brake was turned from ON to OFF or from OFF to ON as determined by the output of the brake switch sensor 23.

If the answer to any of the questions at the step 602 is negative (No), it is judged that the engine operating condition is unsuitable for performing the abnormality detection, and the program is terminated. If on the other hand the answers to all the questions at the step 602 are affirmative (Yes), the program proceeds to a step 603, where detection of abnormality in the evaporative fuel-purging system is performed. This will be described hereinafter with reference to FIG. 11.

When a predetermined time period $t_{PC}$ has elapsed after the start of the engine 1, determinations are carried out as to the cruising condition of the vehicle and the engine coolant temperature $T_W$. Inhibition of purging (purge cut) is carried out over a predetermined time period $t_{KO2AVECKF}$ from the time the vehicle enters the cruising condition after the engine start-up. Purging is carried out only after the lapse of the predetermined time period $t_{KO2AVECKF}$.

Based on values of the correction coefficient $K_{O2}$ obtained during the predetermined time period $t_{KO2AVECKF}$, an average value $K_{O2VPF}$ is calculated. If the difference between this average value $K_{O2VPF}$ and the correction coefficient $K_{O2}$ after purging (the amount of fluctuation of $K_{O2}$, step 603) is smaller than a predetermined limit value $\Delta K_{O2VP}$ over a predetermined time period $t_{VPCK}$ (the answer to step 604 is affirmative), it is judged that there is a failure in the evaporative fuel-purging system (step 605). In other words, if purging is carried out by the evaporative fuel-purging system which is functioning normally, the air-fuel mixture is enriched. The enriched air-fuel ratio of the mixture is detected by the $O_2$ sensor 18, and a corresponding signal is supplied therefrom to the ECU 5 to carry out the air-fuel ratio feedback control which should normally result in a decrease in the value of the correction coefficient $K_{O2}$. Therefore, by monitoring the degree of decrease of $K_{O2}$, it is determined whether or not there is a failure in the evaporative fuel-purging system.

What is claimed is:

1. A method of detecting abnormality in an internal combustion engine having a catalyst system, an evaporative fuel-purging system, a fuel supply system, an air-fuel ratio sensor, an ignition system, and a fuel tank, the method being applied to at least one of said catalyst system, said air-fuel ratio sensor, and said ignition system, for performing detection of abnormality therein according to operating parameters of said engine, the method comprising the steps of:
   (1) detecting an amount of residual fuel in said fuel tank;
   (2) comparing said amount of residual fuel with a predetermined value; and
   (3) inhibiting said abnormality detection when, as a result of said comparison, said amount of residual fuel is below said predetermined value.

2. A method of detecting deterioration of a three-way catalyst of an internal combustion engine having an exhaust passage, said three-way catalyst being arranged in said exhaust passage, a first air-fuel ratio sensor arranged in said exhaust passage at a location upstream of said three-way catalyst for detecting the air-fuel ratio of exhaust gases in said exhaust passage, a second air-fuel ratio sensor arranged in said exhaust passage at a location downstream of said three-way catalyst for detecting the air-fuel ratio of exhaust gases in said exhaust passage, and a fuel tank, the method comprising the steps of:
   (1) obtaining a first signal and a second signal based on respective signals output from said first and second air-fuel ratio sensors at least one of when the fuel supply to said engine is increased and when the fuel supply to said engine is interrupted;
   (2) comparing a waveform of a signal outputted from said first air-fuel ratio sensor with a waveform of a signal output from said second air-fuel ratio sensor, based on said first and second signals while said engine is in a predetermined stable operating condition;
   (3) determining from a result of said comparison whether or not said three-way catalyst is deteriorated;
   (4) detecting an amount of residual fuel in said fuel tank;
   (5) comparing said amount of residual fuel with a predetermined value; and
   (6) inhibiting execution of said steps (1)–(3) when, as a result of said comparison, said amount of residual fuel is below said predetermined value.

3. A method of detecting deterioration of a three-way catalyst of an internal combustion engine having an exhaust passage, said three-way catalyst being arranged in said exhaust passage, a first air-fuel ratio sensor arranged in said exhaust passage at a location upstream of said three-way catalyst for detecting the air-fuel ratio of exhaust gases in said exhaust passage, a second air-fuel ratio sensor arranged in said exhaust passage at a location downstream of said three-way catalyst for detecting the air-fuel ratio of exhaust gases in said exhaust passage, and a fuel tank, the method comprising the steps of;
   (1) obtaining a first signal and a second signal based on respective signals output from said first and second air-fuel ratio sensors when the fuel supply to said engine is increased;
   (2) obtaining a third signal and a fourth signal based on respective signals output from said first and second air-fuel ratio sensors when the fuel supply to said engine is interrupted;
   (3) comparing a waveform of a signal output from said first air-fuel ratio sensor with a waveform of a signal output from said second air-fuel ratio sensor, based on said first to fourth signals while said engine is in a predetermined stable operating condition;
   (4) determining from a result of said comparison whether or not said three-way catalyst is deteriorated.
   (5) detecting an amount of residual fuel in said fuel tank;
   (6) comparing said amount of residual fuel with a predetermined value; and
   (7) inhibiting execution of said steps (1)–(4) when, as a result of said comparison, said amount of residual fuel is below said predetermined value.

4. A method of detecting abnormality in combustion in an internal combustion engine having a crankshaft, and a fuel tank, the method detecting said abnormality based on a change in rotation of said engine, the method comprising the steps of:
   (1) generating pulses according to rotation of said crankshaft at predetermined angles of said crankshaft;
   (2) detecting from said pulses angular acceleration of said crankshaft whenever each of said pulses is generated;
   (3) calculating an average value of the angular acceleration thus detected;
   (4) determining whether or not abnormality has occurred in combustion of said engine, from a difference between the detected angular acceleration and the calculated average value of the angular acceleration (5) detecting an amount of residual fuel in said fuel tank;
(6) comparing said amount of residual fuel with a predetermined value; and
(7) inhibiting execution of said steps (1)–(4) when, as a result of said comparison, said amount of residual fuel is below said predetermined value.

5. A method of detecting abnormality in combustion in an internal combustion engine having a crankshaft, and abnormality based on a change in rotation of said engine, the method comprising the steps of:
   (1) generating pulses according to rotation of said crankshaft whenever said crankshaft rotates through a first predetermined angle;
   (2) adding time intervals between said pulses whenever said crankshaft rotates through a second predetermined angle which is greater than said first predetermined angle, to obtain a time;
   (3) calculating a rotation fluctuation percentage from said time obtained last time and said time obtained at present time;
   (4) comparing the calculated rotation fluctuation percentage with a predetermined limit value;
   (5) determining from a result of said comparison whether or not abnormality has occurred in combustion of said engine;
   (6) detecting an amount of residual fuel in said fuel tank;
   (7) comparing said amount of residual fuel with a predetermined value; and
   (8) inhibiting execution of said steps (1)–(5) when, as a result of said comparison, said amount of residual fuel is below said predetermined value.

6. A method of detecting deterioration of an exhaust gas component concentration sensor for an internal combustion engine having a fuel tank, said exhaust gas component concentration sensor detecting concentration of a component of exhaust gases emitted from said engine, said engine having control means responsive to an output from said exhaust gas component concentration sensor for controlling an amount of fuel supplied to said engine, the method comprising the steps of:
   (1) integrating a difference between said output from said exhaust gas component concentration sensor and a predetermined reference value which is outside a range of said output which can be assumed during normal operation of said exhaust gas concentration sensor;
   (2) comparing a thus obtained integral value with a predetermined deterioration-determining value;
   (3) determining from a result of said comparison whether or not said exhaust gas component concentration sensor is deteriorated;
   (4) detecting an amount of residual fuel in said fuel tank;
   (5) comparing said amount of residual fuel with a predetermined value; and
   (6) inhibiting execution of said steps (1)–(3) when, as a result of said comparison, said amount of residual fuel is below said predetermined value.

7. A method of detecting abnormality in a fuel supply system for supplying fuel to an internal combustion engine having at least one exhaust pipe, and an exhaust gas component concentration sensor arranged in each of said at least one exhaust pipe for detecting concentration of a component of exhaust gases emitted from said engine, wherein an amount of fuel supplied to said engine is controlled in a feedback manner based on an air-fuel ratio correction coefficient set in response to an output signal from said exhaust gas component concentration sensor, the method comprising the steps of:
   (1) calculating an abnormality determination value based on said air-fuel ratio correction coefficient;
   (2) calculating a learned average value of said air-fuel ratio correction coefficient;
   (3) renewing said abnormality determination value when said calculated learned average value of said air-fuel ratio correction coefficient falls outside a first predetermined range defined based upon said abnormality determination coefficient;
   (4) determining that said fuel supply system is abnormal when the renewed value of said abnormality determination value falls outside a second predetermined range defined by predetermined upper and lower limit values.
   (5) detecting an amount of residual fuel in said fuel tank;
   (6) comparing said amount of residual fuel with a predetermined value; and
   (7) inhibiting execution of said steps (1)–(4) when, as a result of said comparison, said amount of residual fuel is below said predetermined value.

8. A method of detecting abnormality in an evaporative fuel-purging system for an internal combustion engine having a fuel tank, and an intake passage, said evaporative fuel-purging system having a canister for adsorbing evaporative fuel from said fuel tank, and a purging passage through which said evaporative fuel is purged from said canister into said intake passage, said engine having a sensor for detecting a parameter reflecting an amount of said evaporative fuel purged into said intake passage,
   the method comprising the steps of:
   (1) determining whether or not said engine is in a predetermined operating condition after completion of warming-up of said engine;
   (2) temporarily inhibiting said purging of said evaporative fuel into said intake passage when it is determined that said engine is in said predetermined operating condition;
   (3) obtaining a first value based on said parameter during said temporary inhibition of said purging of said evaporative fuel;
   (4) obtaining a second value based on said parameter during execution of said purging of said evaporative fuel carried out after said temporary inhibition of said purging of said evaporative fuel;
   (5) comparing said first value with said second value;
   (6) determining whether or not there is abnormality in said evaporative fuel-purging system, based on a result of said comparison.
   (7) detecting an amount of residual fuel in said fuel tank;
   (8) comparing said amount of residual fuel with a predetermined value; and
   (9) inhibiting execution of said steps (1)–(6) when, as a result of said comparison, said amount of residual fuel is below said predetermined value.

* * * * *